(12) United States Patent
Kato et al.

(10) Patent No.: US 6,504,850 B1
(45) Date of Patent: Jan. 7, 2003

(54) ENCODED SIGNAL TRANSMISSION METHOD AND ENCODED SIGNAL TRANSMISSION APPARATUS

(75) Inventors: Motoki Kato, Kanagawa (JP); Hideki Koyanagi, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/158,011

(22) Filed: Sep. 21, 1998

Related U.S. Application Data

(63) Continuation of application No. PCT/JP98/00224, filed on Jan. 21, 1998.

(30) Foreign Application Priority Data

Jan. 21, 1997 (JP) ............................................. 9-008773

(51) Int. Cl.$^7$ ................................................. H04J 3/18
(52) U.S. Cl. ...................................... 370/465; 370/477
(58) Field of Search ................................. 370/527, 538, 370/540, 412, 468, 419, 477, 465; 348/387.1, 385.1

(56) References Cited

U.S. PATENT DOCUMENTS

| | | | |
|---|---|---|---|
| 5,506,844 A | * | 4/1996 | Rao ........................... 370/468 |
| 5,550,590 A | * | 8/1996 | Sakazawa et al. ........ 348/387.1 |
| 5,793,425 A | * | 8/1998 | Balakrishnan ........... 348/387.1 |
| 5,861,919 A | * | 1/1999 | Perkins et al. ........... 348/385.1 |
| 6,188,700 B1 | * | 2/2001 | Kato et al. .................. 370/477 |

FOREIGN PATENT DOCUMENTS

| | | |
|---|---|---|
| JP | 04-271587 A | 9/1992 |
| JP | 04-302598 A | 10/1992 |
| JP | 07-264580 A | 10/1995 |
| JP | 07-273739 A | 10/1995 |
| JP | 09-116520 A | 5/1997 |

\* cited by examiner

*Primary Examiner*—Chau Nguyen
*Assistant Examiner*—Alexander O. Boakye
(74) *Attorney, Agent, or Firm*—Lerner, David, Littenberg, Krumholz & Mentlik, LLP

(57) ABSTRACT

In the case where plural encoder outputs are encoded at variable bit rates and are multiplexed to carry out transmission thereof at a fixed or constant bit rate, the output bit rates from respective buffers are controlled on the basis of delay time τ1 from the time when encoding bit rates of video signals Video 1, Video 2 of the respective encoders have been changed. Thus, the multiplexed bit rate is prevented from exceeding the capacity of the transmission path or causing an overflow of an encoder buffer.

12 Claims, 14 Drawing Sheets

| v1 | v2 | v2 | v2 | v1 | v2 | v2 | v2 | ··· |

FIG.7

ENCODED SIGNAL TRANSMISSION METHOD AND ENCODED SIGNAL TRANSMISSION APPARATUS

CROSS REFERENCE TO RELATED APPLICATIONS

This is a continuation of International Application PCT/JP98/00224 filed Jan. 21, 1998.

BACKGROUND

This invention relates to an encoded signal transmission method and an encoded signal transmission apparatus suitable when used in the case of encoding digital signals at variable bit rate at the transmitting side, and of carrying out transmission of encoded digital signals at variable bit rate to the receiving side.

As the television broadcast of the next generation, plans or schemes to digitize moving picture signals are being developed in order to realize high quality transmission of moving picture signals. In this case, if moving picture signals are digitized as they are, data quantity becomes vast. For this reason, in order to efficiently carry out transmission thereof by way of limited transmission path, encoding (information compression) of data is required.

Meanwhile, in general, moving pictures are not steady, but pattern or motion (movement) of picture changes in point of time. Moreover, there are instances where pattern or motion (movement) at the central portion of picture image and that at the peripheral portion are different to much degree even within picture on screen. For this reason, information quantity generated in carrying out encoding at the encoder changes in dependency upon the property of such picture. In this case, it is known that when variable bit rate encoding is used, high picture quality can be obtained as compared to fixed bit rate by the same code quantity. In order to send such information at fixed transmit bit rate, transmitting buffer is prepared at the final stage of the encoder. Namely, such an approach is employed that encoded output of which quantity generated changes is temporarily stored into the transmitting buffer to read out it at a predetermined transmission bit rate to output it to the transmission path.

Moreover, in the case of carrying out transmission of plural video sequences, when time changes of information quantities of respective pictures of plural video sequences are examined, there is low probability that respective information quantities become great value at the same time. In view of the above, it is known that output data of plural encoders are multiplexed so that sum total of information quantities generated is smoothed. For this reason, in the field of broadcast/communication, plural video sequences are encoded respectively at variable bit rates to multiplex output data of those encoders to allow it to be single bit stream of fixed bit rate to carry out simultaneous transmission thereof. This method is called statistical multiplexing.

FIG. 1 shows a block diagram of system for carrying out statistical multiplexing of outputs of plural encoders as described above (hereinafter called statistical multiplexing encoder system).

The statistical multiplexing encoder system shown in FIG. 1 is composed of n number of encoders $101_1 \sim 101_n$, transmitting buffers $102_1 \sim 102_n$, an encoding bit rate control circuit 103, and a multiplexing circuit 104 for encoder output.

In this case, n number of video signals are delivered to respective encoders $101_1 \sim 101_n$ through respective terminals, and are inputted to the encoding bit rate control circuit 103. The respective encoders $101_1 \sim 101_n$ encode video signals inputted thereto to output encoded data, and to output encoding bit quantities of encoded data.

The encoding bit rate control circuit 103 calculates encoding bit rates R1~Rn corresponding to the property of input picture images of respective encoders from n number of video signals inputted thereto and encoding bit quantities from respective encoders. At this time, control is conducted such that sum total of R1 to Rn every predetermined time becomes constant. Encoding bit rates of respective encoders $101_1 \sim 101_n$ are changed every 15 frames, for example. Transmitting buffers $102_1 \sim 102_n$ are respectively provided at succeeding stages of respective encoders $101_1 \sim 101_n$ to respectively temporarily store encoded data from the respective encoders $101_1 \sim 101_n$ into the transmitting buffers $102_1 \sim 102_n$ to absorb changes of code quantities generated. The multiplexing circuit 104 multiplexes, in a time divisional manner, plural output bit streams respectively delivered from the respective buffers $102_1 \sim 102_n$ to send out it to the transmission path as single bit stream.

Such statistical multiplexing encoder system is disclosed in detail, e.g., in Bulletin of Television Society Vol. 50, No. 7, pp. 958–964 (1996).

In statistical multiplexing encoder system as described above, there is known a method of conducting a control such that sum total of encoding bit rates every predetermined time to respective encoders becomes constant to adaptively carry out bit rate allocation.

For example, in the statistical multiplexing encoder system shown in FIG. 1, control is conducted in the state where sum total of R1 to Rn is limited so as to cause it to be maintained constant when determining Rn from encoding bit rate R1 every predetermined time in correspondence with the property of input pictures of respective encoders.

However, employment of only such limitation is insufficient as the condition for allowing input bit rate to the multiplexer to be kept stably constant and allowing output bit rate from the multiplexer to be kept stably constant. The reason thereof is that it is not guaranteed that sum total of output bit rates of buffers of respective encoders becomes constant. For example, when delay time from the time when encoding bit rate Ri has been changed at the i-th encoder $101_i$ (i=1~n) until output bit rate Rout_i of buffer $102_i$ changes is assumed to be τi, in the case where τi is not constant at respective encoders, even if control is conducted such that sum total of encoding bit rates R1~Rn every predetermined time becomes constant, it is not guaranteed that sum total of output bit rates Rout_1 to Rout_n every predetermined time from respective buffers becomes constant.

For this reason, there were possibility that there may take place the problem that sum total of input bit rates to the multiplexer is above the capacity of the transmission path, the problem that multiplexed output bit rate may be above the capacity of the transmission path and/or the problem that buffer of the encoder or the decoder may overflow or underflow.

SUMMARY OF THE INVENTION

This invention has been made in view of the above-described problems and its object is to provide an encoded signal transmission method and an encoded signal transmission apparatus in which in the case where outputs from plural encoders for encoding digital signals at variable bit rate are multiplexed to carry out transmission at fixed (constant) bit rate, control is conducted such that sum total of input bit rates to the multiplexer and/or multiplexed output bit rate do not exceed the capacity of the transmission path, and buffer of the encoder or the decoder may not overflow or underflow.

In an encoded signal transmission method according to this invention, an approach is employed to encode a digital signal at variable bit rate to smooth change of code quantity of short time at buffer to control output bit rate from the buffer on the basis of delay time $\tau$ from the time when encoding bit rate of the encoder has been changed until output bit rate of the buffer changes in outputting bit stream at a predetermined bit rate from the buffer.

It is preferable that the delay time $\tau$ is determined by $$\tau = B/R\min$$

when minimum value of encoding bit rate of the encoder is Rmin and decoder buffer size is B.

Moreover, in the case where n (n≧2) number of the encoders are provided to respectively provide encoder buffers at respective encoders to multiplex respective buffer outputs to carry out transmission thereof, output bit rates from the respective encoder buffers are controlled on the basis of respective delay times $\tau i$ (i=1~n) from the time when encoding bit rates of respective encoders have been changed until output bit rates of the buffers change.

Also in this case, it is preferable that the respective delay times $\tau i$ are determined by $$\tau i = B/R\min\_i$$

when minimum value of encoding bit rate of each encoder is Rmin_i and decoder buffer size is B.

Moreover, it is preferable to select maximum value $\tau$max of delay time $\tau i$ with respect to respective encoders to change output bit rates of respective buffers after delay time ($\Delta\tau$ is fixed time of 0 or more common to the n number of encoders in this case) from the time when encoding bit rates of respective encoders are changed ($\tau$max+$\Delta\tau$).

Further, it is preferable to select maximum value $\tau$max of delay time $\tau i$ with respect to respective encoders to use such a predetermined time $\delta i$ to satisfy $$R1(t+\delta 1)+R2(t+\delta 2)+ \ldots +Rn(t+\delta n)=\text{constant}$$

when encoding bit rate at time t of the i-th (i=1~n) encoder of n number of encoders is assumed to be Ri(t) to change output bit rate of the i-th encoder after delay time of ($\tau$max+$\delta i$) from the time when encoding bit rate of the i-th encoder is changed, and the predetermined time $\delta i$ is determined by $$\delta i = \tau\max - \tau i.$$

Further, an encoded signal transmission apparatus to which such an encoded signal transmission method is applied may be constituted.

Outputs from respective encoder buffers are sent to multiplexer, at which they are multiplexed. The multiplexed output thus obtained is caused to undergo transmission. At this time, an approach is employed to control output bit rates from respective encoder buffers on the basis of respective delay times $\tau i$, thereby making it possible to allow sum total of input bit rates to the multiplexer to be stably constant.

BRIEF DESCRIPTION OF THE DRAWINGS

FIG. 7 is a view showing an example for multiplexing plural bit streams in time divisional manner.

DETAILED DESCRIPTION OF THE PREFERRED EMBODIMENTS

The embodiment of an encoded signal transmission apparatus to which an encoded signal transmission method according to this invention is applied will now be described with reference to the attached drawings. While explanation will be given in connection with encoding and transmission of video signals in the description of the above-mentioned embodiment, this invention can be applied not only to video signals but also audio signals, etc.

Figure 1:
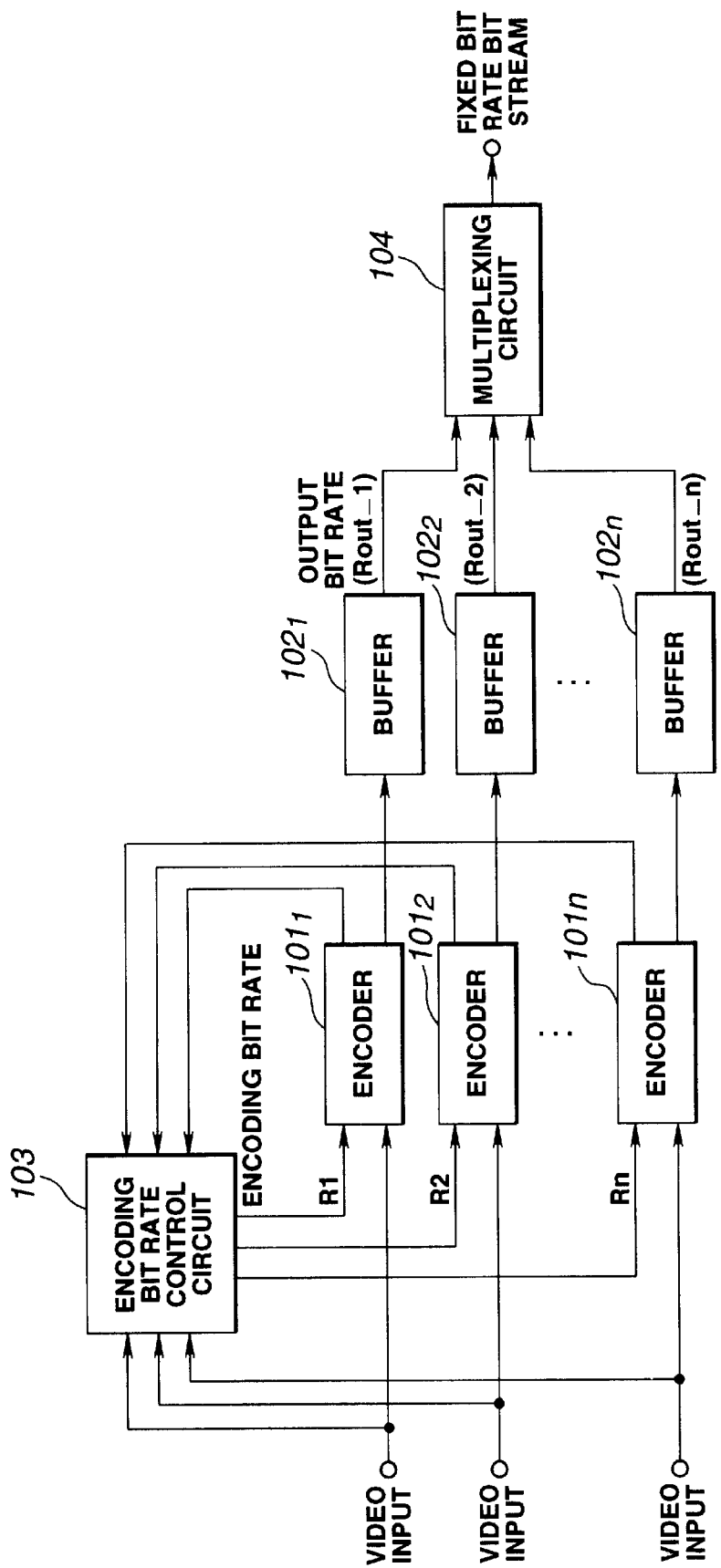
FIG. 1 is a view showing a conventional statistical multiplexing encoder system.
Figure 2:
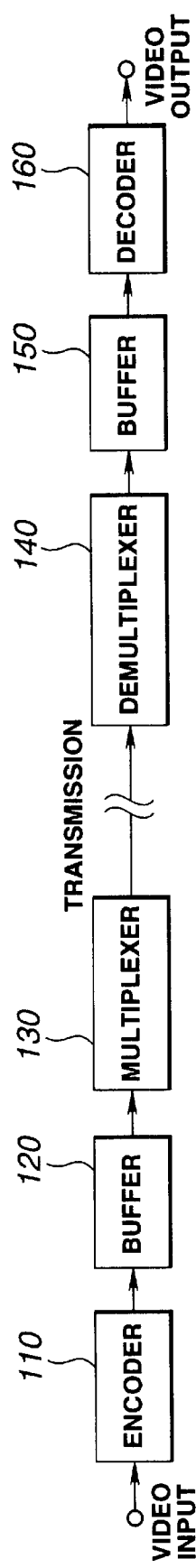
FIG. 2 is a block diagram showing outline of the configuration of encoder/decoder system to which the first embodiment according to this invention can be applied.

Initially, as an example of the system to which the embodiment of the encoded signal transmission apparatus according to this invention is applied, FIG. 2 shows a block diagram of the system in the case where the encoder and the decoder operate in an interlocking manner on the real time basis through the transmission path as in the case of broadcast or communication.

In the FIG. 2 mentioned above, a buffer 120 is provided at the output side of an encoder 110 to smooth change of code quantity of short time. As a result, output bit stream is outputted at a predetermined bit rate from the buffer 120, and is inputted to a multiplexer 130. Although not shown, the multiplexer 130 is also supplied with bit stream from other video encoder and/or bit stream from audio encoder, and those bit streams are multiplexed. Further, bit stream designated from user is separated at a demultiplexer 140, and this bit stream is inputted to a buffer 150. A decoder 160 decodes bit stream from the buffer 150 to output decoded moving picture. At this time, it is necessary that total delay time from encoder input of a certain picture until decoder output of that picture, which is so called end-to-end delay, is constant. While buffer delay of the encoder and the decoder is variable among them, it is necessary that sum of buffer delays of the encoder and the decoder with respect to respective pictures is constant. In the case where such condition does not hold, overflow or underflow takes place at buffer of the encoder or the decoder.

Figure 3:
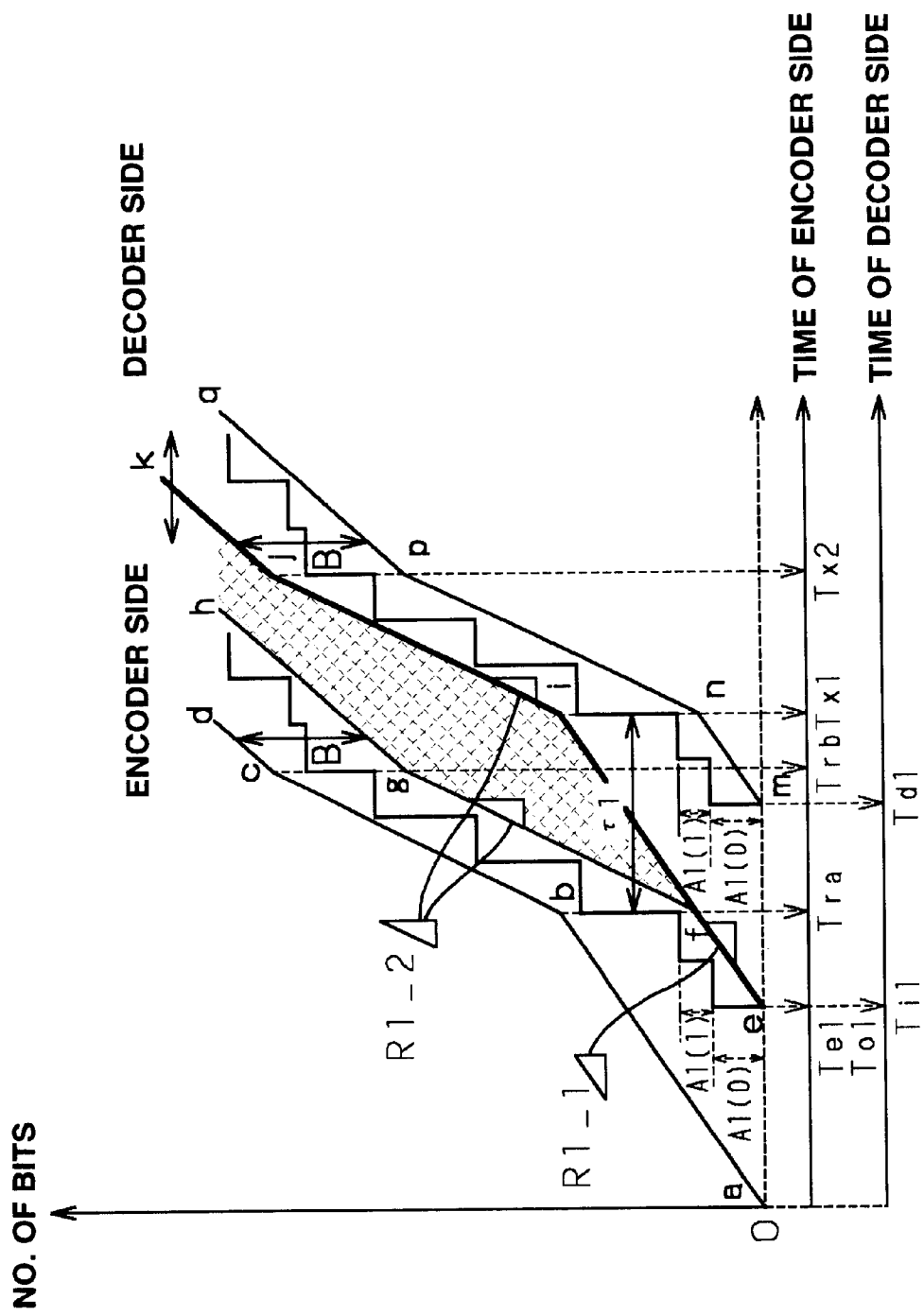
FIG. 3 is a view for explaining change of bit occupation quantity of buffers of encoder and decoder when variable bit rate is employed.
Figure 4:
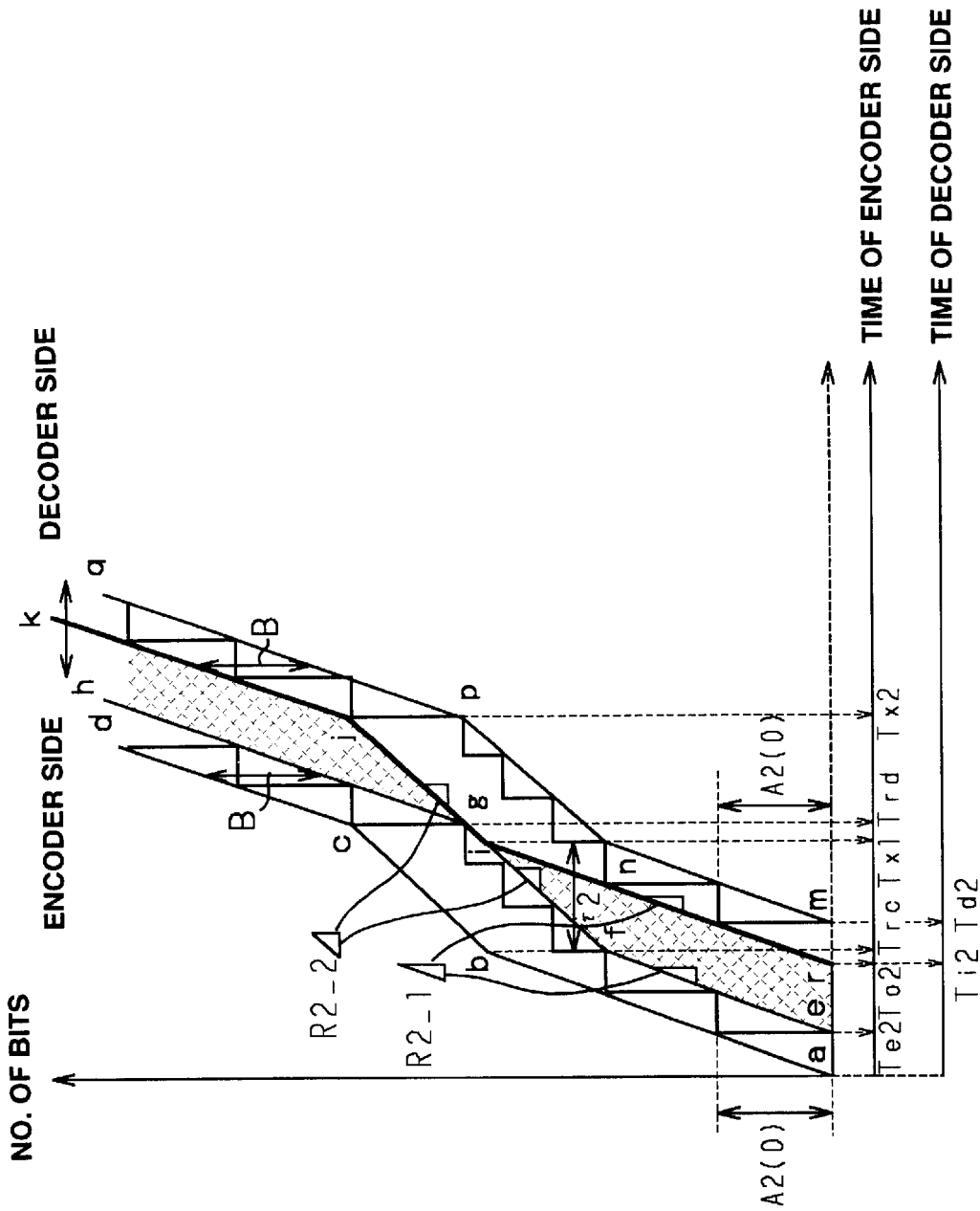
FIG. 4 is a view for explaining change of bit occupation quantity of buffers of encoder and decoder when variable bit rate is employed.

In this case, FIGS. 3 and 4 show examples of respective changes of bit occupation quantities of respective buffers of the encoder and the decoder in the case where input video signal is caused to undergo transmission after encoding at variable bit rate on the real time basis at the encoder side to receive and decode encoded input video signal at the decoder side.

In FIG. 3, the left side from polygonal line e-f-i-j-k represents the state of the encoder buffer 120, and the right side from the above-mentioned polygonal line e-f-i-j-k represents the state of the decoder buffer 150. The abscissa t represents passing of time. In this case, two time axes are drawn. The upper time axis represents passing of time of the encoder side and the lower time axis represents passing of time of the decoder side. For simplification of illustration, description is made such that the polygonal line e-f-i-j-k is shared at the encoder side and the decoder side so that there is no time difference therebetween. In actual, however, a predetermined transmission path delay time exists between the encoder side and the decoder side. In addition, the ordinate represents accumulated value of bit quantities until a certain time of output bit stream outputted from the buffer at the encoder side, and represents accumulated value of bit quantities until a certain time of bit stream inputted to the buffer at the decoder side.

Gradient (R1_1) of line e-f and gradients (R1_2) of line f-g and line i-j represent bit rates at the encoder side or the decoder side, and these gradients R1_1 and R1_2 are different from each other. Namely, polygonal line e-f-g-h represents change of encoding bit rate of encoder 110, and is indicated with the gradient being changed from t=Tra (time of point f) and t=Trb (time of point g). B represents decoder buffer size, and B is constant. A1(j) (j starts from 0) represents the j-th encoded picture of first video signal video 1, and its size represents bit quantity.

Respective times shown on the time axis of the abscissa are

Te1: encode time of picture A(0) of video 1 (first video signal)

To1: time at which bit stream of video 1 starts output from the buffer

Tra: time at which encoding bit rate of video 1 changes from R1_1 to R1_2

Trb: time at which encoding bit rate of video 1 changes from R1_2

Tx1: time at which output bit rate from buffer of video 1 changes from R1_1 to R1_2

Tx2: time at which output bit rate from buffer of video 1 changes from R1_2

Ti1: input time to decoder buffer of bit stream of video 1

Td1: decode time of picture A1(0) of video 1

Encode operations of respective pictures of the first video signal video 1 are advanced (developed) at interval of picture rate (e.g., 1/29.97 sec.) from t=Te1, and decode operations of respective pictures are advanced (developed) at the same picture rate interval from t=Td1.

At the encoder buffer 120 side, the region of the lower side of the stair-stepped locus of FIG. 3 represents change of bit occupation quantity of the buffer. Encode operation of the j-th picture A1(j) is momentarily carried out at the encoder 110, and (bit quantity of) this picture A1(j) is momentarily inputted to the buffer 120. Thus, after encoding of A1(j), the bit occupation quantity is momentarily increased by A1(j). Further, bit stream is outputted at a predetermined bit rate from the buffer 120 until the next encoding time. Thus, the bit occupation quantity is decreased.

At the decoder buffer 150 side, the region of the upper side of the stair-stepped locus of FIG. 3 indicates change of bit occupation quantity of the buffer. A1(j) is momentarily outputted from the buffer 150, and is momentarily decoded at the decoder 160. Thus, after decoding of A1(j), the bit occupation quantity is momentarily decreased by A1(j). Then, bit stream is inputted to the buffer 150 at a predetermined bit rate until the next decoding time. Thus, bit occupation quantity is increased.

In this case, when the minimum value of encoding bit rate of first video signal video 1 is assumed to be Rmin1, the maximum value thereof is assumed to be Rmax1 and size of the decoder buffer 150 is assumed to be B, the minimum delay time from the time when encoding bit rate has been changed at the encoder 110 until output bit rate of the buffer 120 is changed is τi obtained by calculation at the following formula (1). Moreover, size Bmax1 required even at the minimum at the encoder buffer 120 is calculated by the following formula (2). Namely, $$\tau1 = B/R\mathrm{min}1 \qquad (1)$$

$$B\mathrm{max}1 = B * R\mathrm{max}1/R\mathrm{min}1 \qquad (2)$$

The minimum time of the end-to-end delay from the time when a certain picture has been inputted to the encoder 110 until that picture is outputted from the decoder 160 is expressed as follows:

$$T1 = \tau1 + CH(\mathrm{constant}) \qquad (3)$$

In this case, CH is a constant transmission path delay time between multiplexer 130 and demultiplexer 140.

Moreover, in FIG. 4, the left side from the polygonal line r-i-j-k represents the state of the buffer 120 and the right side from the same line represents the state of the buffer 150. The polygonal line e-f-g-h represents change of encoding bit rate of the encoder 110 and is indicated with the gradient being changed from t=Trc (time of point f) and t=Trd (time of point g). A2(j) (j starts from zero) represents the j-th encoded picture of the second video signal video 2, and its magnitude represents bit quantity.

In this FIG. 4, respective times shown on the time axis are:

Te2: encode time of picture A2(0) of video 2 (second video signal)

To2: time at which bit stream of video 2 starts output from the buffer

Trc: time at which encoding bit rate of video 2 changes from R2_1 to R2_2

Trd: time at which encoding bit rate of video 2 changes from R2_2

Tx1: time at which output bit rate from buffer of video 2 changes from R2_1 to R2_2

Tx2: time at which output bit rate from buffer of video 2 changes from R2_2

Ti2: input time to decoder buffer of bit stream of video 2

Td2: decode time of picture A2(0) of video 2

Encode operations of respective pictures of the second video signal video 2 are developed at interval of the same picture rate as that of the first video signal video 1 from t=Te2, and decode operations of respective pictures are also developed at interval of the same picture rate from t=Td2.

In this case, when the minimum value of encoding bit rate of the second video signal video 2 is assumed to be Rmin2, the maximum value thereof is assumed to be Rmax2 and size of the decoder buffer 150 is assumed to be B, the minimum delay time from the time when encoding bit rate has been changed at the encoder 110 until output bit rate of the buffer 120 changes is $\tau 2$ obtained by calculation at the following formula (4). In addition, size Bmax2 required even at the minimum at the buffer 120 is calculated by the following formula (5).

Namely, $$\tau 2 = B/R\min 2 \qquad (4)$$

$$B\max 2 = B * R\max 2/R\min 2 \qquad (5)$$

The minimum time of end-to-end delay which is total delay quantity from the time when a certain picture has been inputted to the encoder 110 until that picture is outputted from the decoder 160 is expressed as follows.

$$T2 = \tau 2 + CH(\text{constant}) \qquad (6)$$

In this embodiment, the following relationship is assumed to hold.

$$\tau 2 < \tau 1 \qquad (7)$$

Accordingly, it is assumed that the first video signal video 1 is permitted to undergo transmission from the encoder to the decoder at low delay than the second video signal video 2.

In the first video signal video 1 of FIG. 3 and the second video signal video 2 of FIG. 4, encoding bit rates of respective encoders are assumed to be changed at the same time interval. For example, the time interval from t=Te1 which is encoding bit rate R1_1 of FIG. 3 to t=Tra and the time interval from t=Te2 which is encoding bit rate R2_1 of FIG. 4 to t=Trc are equal to each other. Moreover, the time interval from t=Tra which is encoding bit rate R1_2 of FIG. 3 to t=Trb and the time interval from t=Trc which is encoding bit rate R2_2 of FIG. 4 to t=Trd are equal to each other. The following relationship is assumed to exist.

$$(R1\_1 + R2\_1) = (R1\_2 + R2\_2) = \text{constant} \qquad (8)$$

At this time, an embodiment of an encoded signal transmission method of this invention for multiplexing bit stream outputted from encoder buffer of the first video signal video 1 and bit stream outputted from encoder buffer of the second video signal video 2 to output multiplexed bit stream of fixed (constant) bit rate will now be described below.

Figure 5:
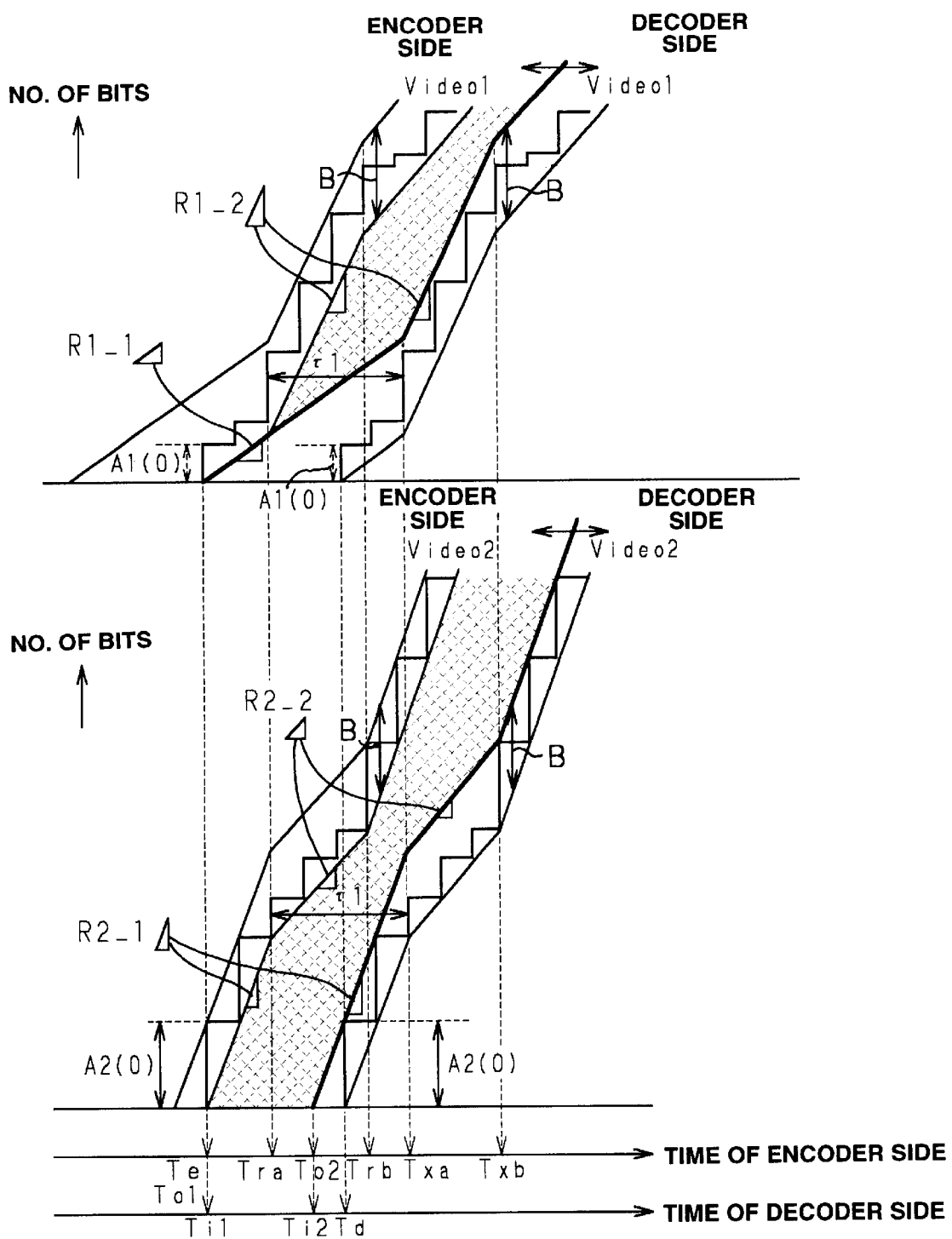
FIG. 5 is a view for explaining change of bit occupation quantity of buffers of encoder and decoder when two encoder outputs are subjected to transmission after undergone multiplexing by the embodiment of this invention.

FIG. 5 is a view for explaining the method of the first embodiment of the encoded signal transmission method according to this invention. In this method, the delay time from the time when encoding bit rate has been changed at the encoder until output bit rate of encoder buffer changes in the first video signal video 1 and that in the second video signal 2 are assumed to be equal to each other. As shown in FIG. 5, the delay times of the first video signal video 1 and the second video signal video 2 are caused to be equal to larger $\tau 1$.

In this FIG. 5, respective times of the time axis of the abscissa are

Te: encode time of A1(0) of video 1, encode time of A2(0) of video 2

To1: time at which bit stream of video 1 starts output from the buffer

To2: time at which bit stream of video 2 starts output from the buffer

Tra: time at which encoding bit rate of video 1 changes from R1_1 to R1_2, time at which encoding bit rate of video 2 changes from R2_1 to R2_2

Trb: time at which encoding bit rate of video 1 changes from R1_2, time at which encoding bit rate of video 2 changes from R2_2

Txa: time at which output bit rate from buffer of video 1 changes from R1_1 to R1_2, time at which output bit rate from the buffer of video 2 changes R2_1 to R2_2

Txb: time at which output bit rate from buffer of video 1 changes from R1_2, time at which output bit rate from buffer of video 2 changes from R2_2

Ti1: time at which bit stream of video 1 starts input to the decoder buffer

Ti2: time at which bit stream of video 2 starts input to the decoder buffer

Td: decode time of A1(0) of video 1, decode time of A2(0) of video 2

Respective ones of the first video signal video 1 and the second video signal video 2 change in such a manner that output bit rates from respective buffers are expressed by the following formula (9) after $\tau 1$ even at the minimum from the time when encoding bit rates of respective encoders are changed $$\tau 1 = Txa - Tra = Txb - Trb \qquad (9)$$

In this example, it is sufficient to allow this time to be larger than $\tau 1$. In that case, according as the time becomes larger, encoder buffer of larger size is required. This will be described later.

By the method of this first embodiment, sum RSUM of output bit rates from respective encoder buffers of the first video signal video 1 and the second video signal video 2 is kept constant. RSUM is expressed as follows.

Within the range from t=To2 to t=Txa, RSUM=(R1_1+R2_1)

Within the range from t=Txa to t=Txb to RSUM=(R1_2+R2_2)

These values become constant.

In this case, for a time period from t=To1 to t=To2, only output bit stream of the first video signal video 1 is outputted. Since the output bit rate at this time is smaller than the constant value, an approach may be employed to insert stuffing bit insignificant for output bit stream, etc. to hold the output bit rate value to be fixed value.

Figure 6:
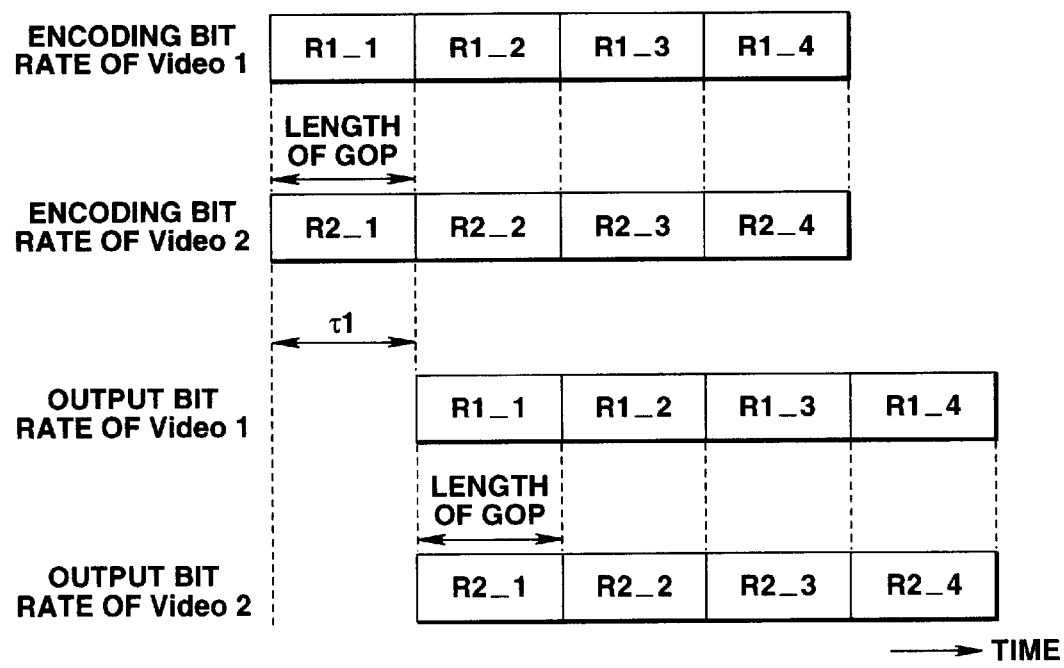
FIG. 6 is a view showing encoding bit rate of input picture and timing of its output bit rate in the example of FIG. 5.

FIG. 6 is a view for explaining time changes of encoding bit rates of respective encoders of the first video signal video 1 and the second video signal video 2 and output bit rate from the encoder buffer in the above-described example. In this case, as an example, time unit for changing encoding bit rate is assumed to be GOP (e.g., 15 frames). Encoding bit rates of the first video signal video 1 and the second video signal video 2 change at the same time, and output bit rates are both changed after delay time $\tau 1$. Sum total of output bit rates of the first video signal video 1 and the second video signal video 2 becomes constant value.

Figure 7:
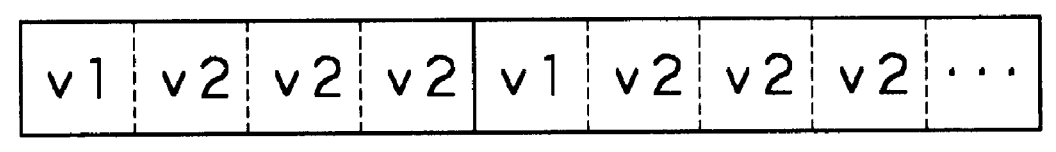

FIG. 7 is an example where output bit streams of the first video signal video 1 and the second video signal video 2 are multiplexed. When, e.g., the first video signal video 1 is 1 Mbps and the second video signal video 2 is 3 Mbps, those video signals are multiplexed in a time divisional manner at a rate of three packets of the second video signal video 2 with respect to one packet of the first video signal video 1 as shown to carry out transmission of multiplexed bit stream of 4 Mbps.

It is to be noted that while explanation has been given in connection with the case where the number of video encoders is 2 in the method of the above-described first embodiment, this invention can be also applied to three video encoders or more. In addition, this invention is not limited only to video encoder but also audio encoder.

Figure 8:
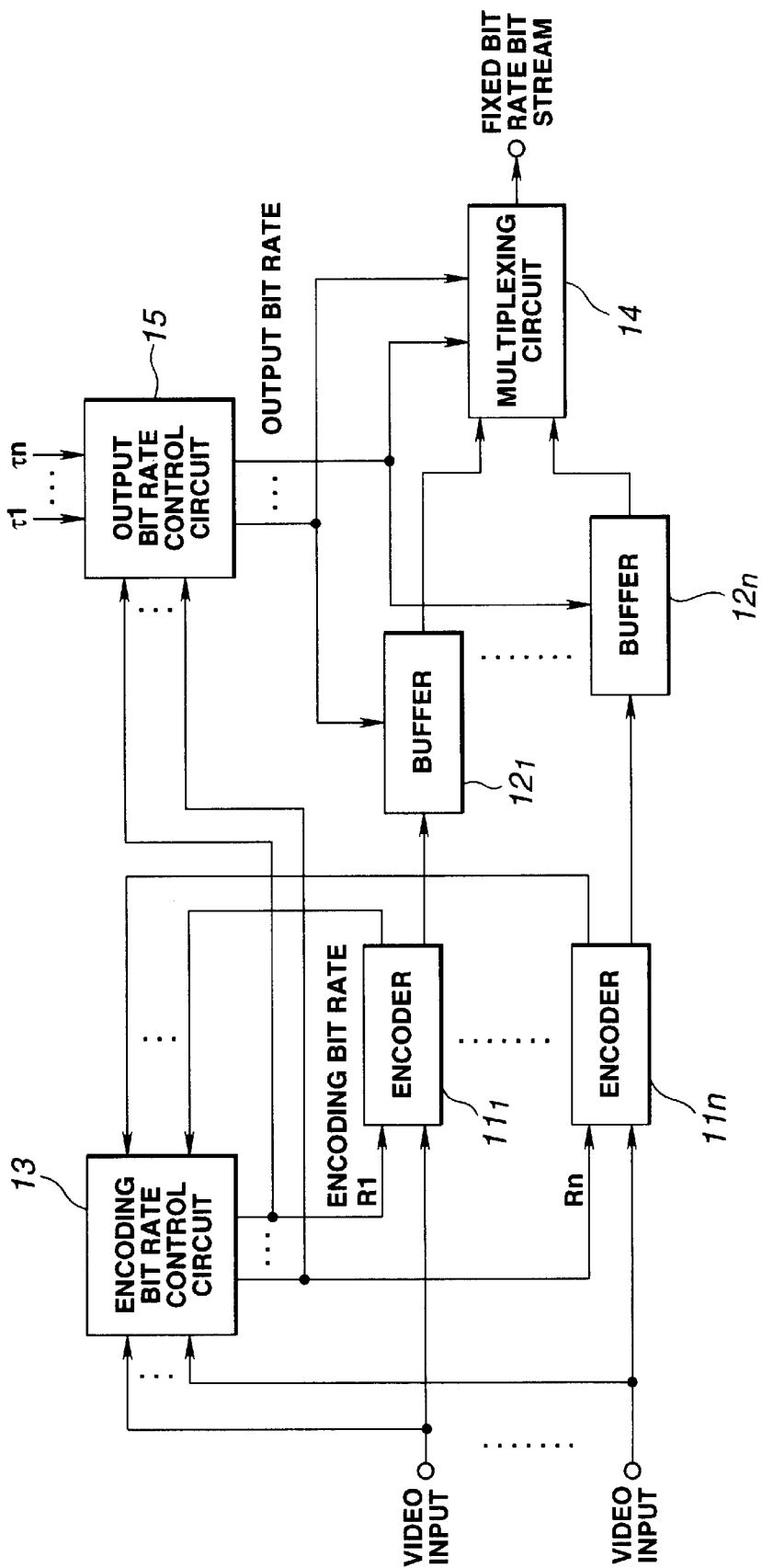
FIG. 8 is a block diagram showing encoding system for realizing the example of FIG. 5.

FIG. 8 shows a block diagram of statistical multiplexing encoder system to which the encoded signal transmission method of the above-described first embodiment is applied.

The statistical multiplexing encoder system shown in FIG. 8 is composed of n number of encoders $11_1$~$11_n$, transmitting buffers (encoder buffers) $12_1$~$12_n$, an encoded bit rate control circuit 13, and a multiplexing circuit 14 for encoder outputs, and an output bit rate control circuit 15 is further provided.

Plural, e.g., n number of video signals are respectively delivered to encoders $11_1$~$11_n$ through respective terminals, and are delivered to the encoding bit rate control circuit 13. The respective encoders $11_1$~$11_n$ encode inputted video signals to output encoded data, and to output encoding bit quantity of encoded data.

The encoding bit rate control circuit 13 calculates encoding bit rates R1~Rn corresponding to the property of input pictures of respective encoders $11_1$~$11_n$ from inputted n number of video signals and encoding bit quantities from the respective encoders $11_1$~$11_n$. At this time, control is conducted such that sum total of R1~Rn every predetermined time becomes constant. Encoding bit rates R1~Rn of respective encoders $11_1$~$11_n$ are changed, e.g., every 15 frames. At the succeeding stages of respective encoders $11_1$~$11_n$, transmitting buffers $12_1$~$12_n$ are respectively provided. Encoded data from the respective encoders $11_1$~$11_n$ are respectively temporarily stored into the transmitting buffers $12_1$~$12_n$, to absorb change of code quantity generated. The multiplexing circuit 14 multiplexes, in a time divisional manner, plural bit streams which have been respectively read out of the respective buffers $12_1$~$12_n$, to send out it as one bit stream to-the transmission path.

Moreover, encoding bit rates R1~Rn of the respective encoders $11_1$~$11_n$ from the encoding bit rate control circuit 13 are inputted to the output bit rate control circuit 15. Further, the output bit rate control circuit 15 is supplied with respective delay times τ1~τn from the time when encoding bit rate has been changed until output bit rates of encoder buffers $12_1$~$12_n$, are changed. The output bit rate control circuit 15 selects maximum value τmax among respective delay times τ1~τn. Then, the output bit rate control circuit 15 give an instruction to change output bit rate with respect to the buffers $12_1$~$12_n$ and the multiplexing circuit 14 after delay time of (τmax+Δτ) from the time when encoding bit rates of respective encoders have been changed. In this case, Δτ is constant time of 0 or more common to n number of encoders.

The operation every predetermined time period of the output bit rate control circuit 15 will now be described with reference to the flowchart shown in FIG. 9.

Figure 9:
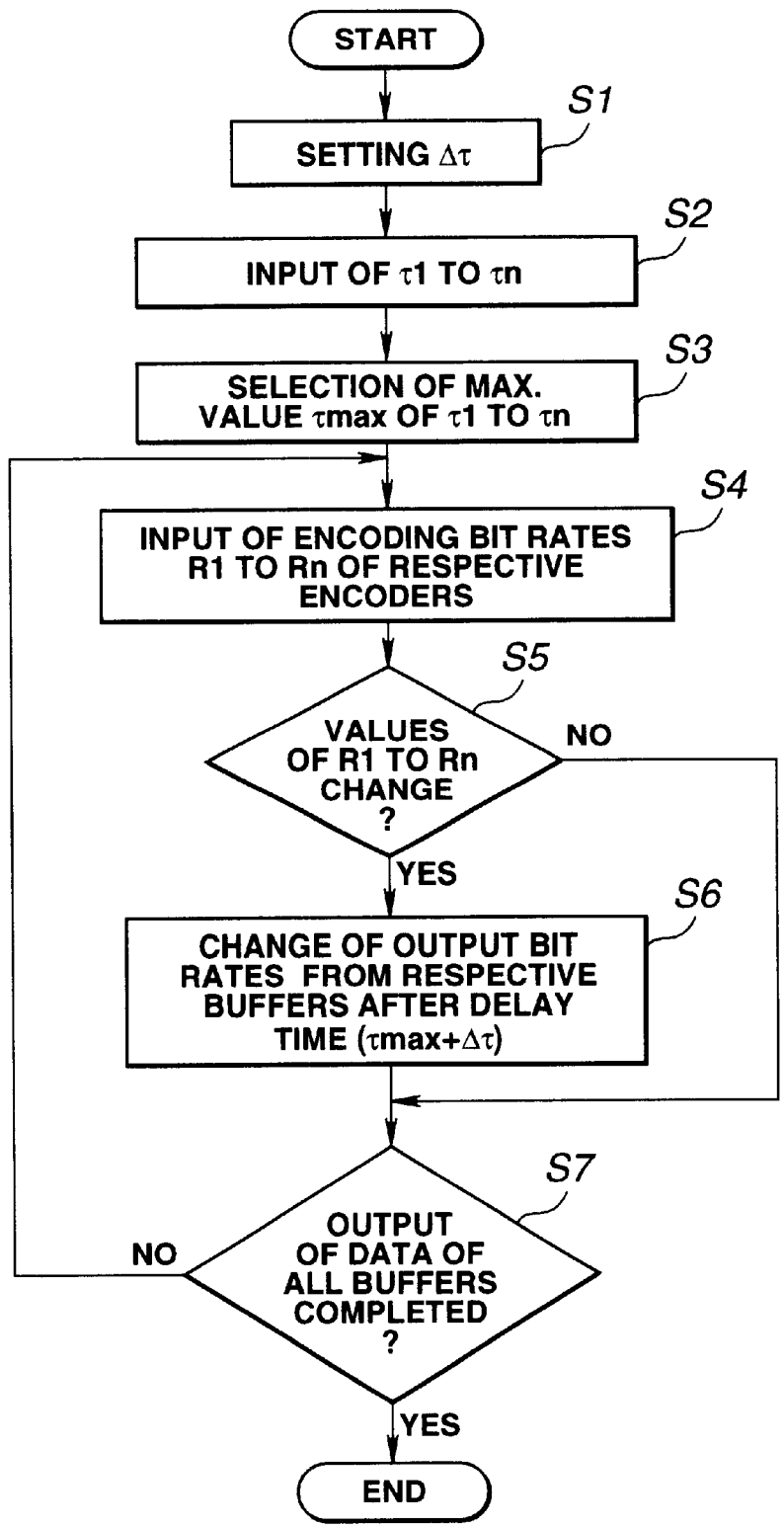
FIG. 9 is a flowchart for explaining the operation of output bit rate control circuit of FIG. 8.

Initially, at step S1 of this FIG. 9, constant time Δτ of 0 or more common to respective encoders $11_1$~$11_n$ is set. At step S2, with respect to respective encoders $11_1$~$11_n$, respective delay times τ1~τn from the time when encoding bit rates have been changed until output bit rates of the encoder buffers $12_1$~$12_n$, are changed are inputted. Further, the processing operation proceeds to step S3, at which maximum value τmax among respective delay times τ1~τn is selected. At step S4, encoding bit rates R1~Rn of respective encoders $11_1$~$11_n$ from the encoding bit rate control circuit 13 are inputted. Then, the processing operation proceeds to step S5, at which whether or not values of encoding bit rates R1~Rn have been changed is judged. If values of the encoding bit rates R1~Rn are changed, the processing operation proceeds to step S6. At this step, encoding bit rates are delivered to the buffers $12_1$~$12_n$, and the multiplexing circuit 14 as output bit rate so as to change output bit rates of respective buffers $12_1$~$12_n$ into its changed encoding bit rate after delay time of (τmax+Δτ)is passed from the time when values of the encoding bit rates R1~Rn are changed. Moreover, in the case where values of encoding bit rates R1~Rn are not changed, the operation of the step S6 is skipped. Then, the processing operation proceeds to step S7. At this step, whether encoded data of all buffers $12_1$~$12_n$ have been outputted is judged. In the case where no encoded data is outputted, the processing operation returns to the step S4. Thus, the above-described operation will be repeated. In addition, in the case where encoded data of all buffers $12_1$~$12_n$, are outputted, its operation is completed.

In this example, required buffer size B_i even at the minimum for the i-th encoder $11_i$ is calculated by the following formula (10), i.e., $$B\_i = B * R\max\_i / R\min\_i + R\max\_i * (\tau\max - \tau i) \qquad (10)$$

In this case, Rmin_i and Rmax_i are respectively minimum value and maximum value of encoding bit rate of the i-th encoder $11_i$, and B is decoder buffer size.

When the above-mentioned Δτ is greater than 0 or more, size of ΔB_i further calculated at the following formula (11), i.e., size of buffer expressed as below $$\Delta B\_i = R\max\_i * \Delta\tau \qquad (11)$$

is additionally required as buffer size necessary for the i-th encoder.

Figure 10:
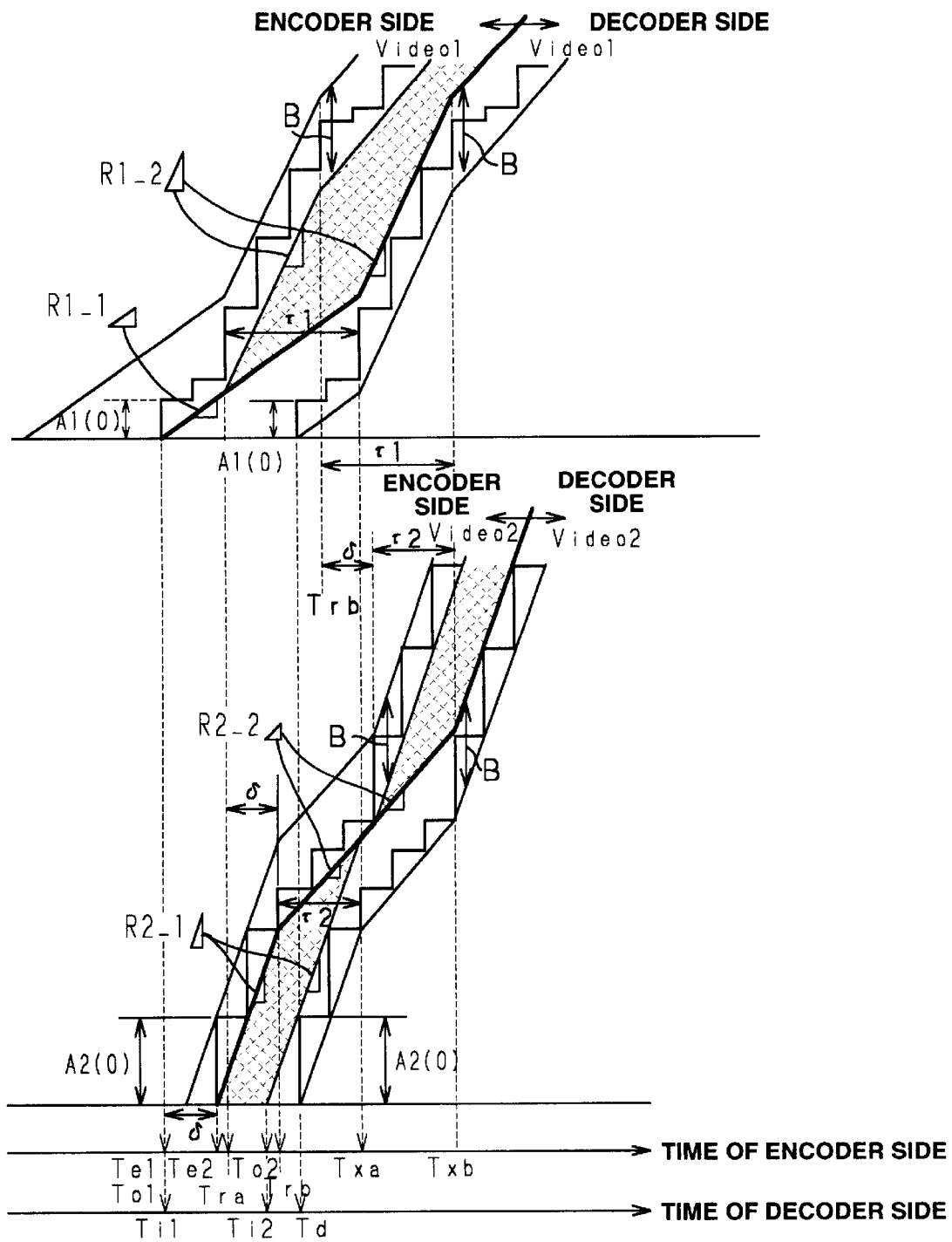
FIG. 10 is a view for explaining change of bit allocation quantity of buffers of encoder and decoder when two encoder outputs are caused to undergo transmission after subjected to multiplexing by another embodiment of this invention.

FIG. 10 is a view for explaining the second embodiment of this invention. This embodiment contemplates that in the case where delay times τ from the time when encoding bit rate of the encoder has been changed until output bit rate of the encoder buffer is changed at respective encoders are different from each other, an approach is employed to vary encoding bit rate of other encoder after a predetermined delay time from the time when the maximum encoding bit rate of the encoder where τ is maximum is changed.

As shown in this FIG. 10, delay times τ of the first video signal video 1 and the second video signal video 2 are respectively τ1 and τ2, and when the relationship expressed as τ1>τ2 holds, encoding bit rate of the second video signal video 2 is changed after delay time δ indicated by the following formula (12) from the time when encoding bit rate of the first video signal video 1 has been changed $$\delta = \tau 1 - \tau 2 \qquad (12)$$

In this case, explanation of respective times of the time axis of the abscissa is as follows.

Te1: Encode time of A1(0) of video 1
Te2: Encode time of A2(0) of video 2
To1: time at which bit stream of video 1 starts output from the buffer To2: time at which bit stream of video 2 starts output from the buffer Tra: time at which encoding bit rate of video 1 changes from R1_1 to R1_2

Trb: time at which encoding bit rate of video 1 changes from R1_2

Trc: time at which encoding bit rate of video 2 changes from R2_1 to R2_2

Trd: time at which encoding bit rate of video 2 changes from R2_2

Txa: time at which output bit rate from buffer of video 1 changes from R1_1 to R1_2, time at which output bit rate from buffer of video 2 changes from R2_1 to R2_2

Txb: time at which output bit rate from the buffer of video 1 changes from R1_2, time at which output bit rate from the buffer of video 2 changes from R2_2

Ti1: time at which bit stream of video 1 starts input to the decoder buffer

Ti2: time at which bit stream of video 2 starts input to the decoder buffer

Td: decode start time of A1(0) of video 1, decode start time of A2(0) of video 2

In this case, $$\delta = Trc - Tra = Trd - Trb \quad (13)$$

Further, in the first video signal video 1, after encoding bit rate has been changed, output bit rate from the buffer changes after delay time $\tau i$. Moreover, in the second video signal video 2, after encoding bit rate is changed, output bit rate from the buffer changes after delay time $\tau 2$. Namely, $$\tau 1 = Txa - Tra = Txb - Trb \quad (14)$$

$$\tau 2 = Txa - Txc = Txb - Trd \quad (15)$$

In this case, while these times $\tau 1, \tau 2$ may be caused to be respectively $(\tau 1+\Delta\tau), (\tau 2+\Delta\tau)$ which are allowed to be large by $\Delta\tau$. In that case, according as $\Delta\tau$ becomes larger, encoder buffer of larger size is required. This will be described later.

In accordance with the second method, sum RSUM of output bit rates from respective encoder buffers of the first video signal video 1 and the second video signal video 2 is kept constant. RSUM is expressed as follows.

Within the range from t=To2 to t=Txa, RSUM=(R1_1+ R2_1)

Within the range from t=Txa to t=Txb, RSUM=(R1_2 +R2_2)

Thus, RSUM becomes constant.

It is to be noted that within the range from t=To1 to t=To2, only bit stream of the first video signal video 1 is outputted, and since the output bit rate at this time is smaller than the fixed value, an approach may be employed to insert insignificant stuffing bits into output bit stream, etc. thus to keep output bit rate value at constant value.

Figure 11:
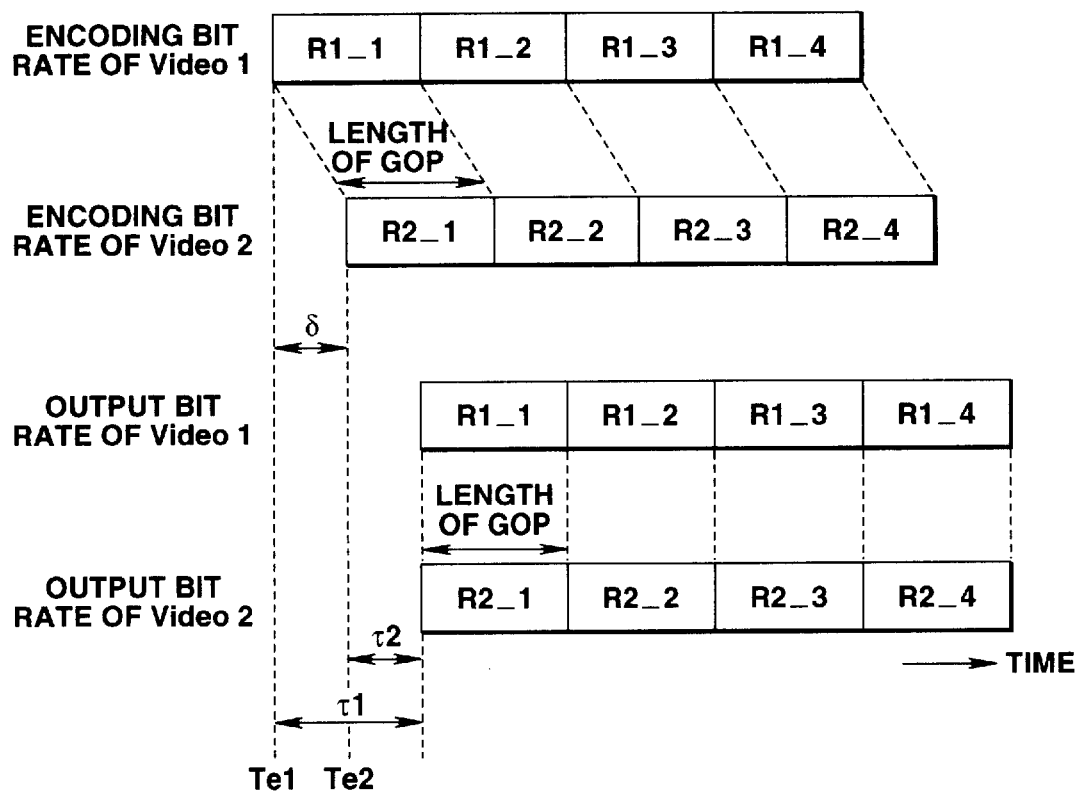
FIG. 11 is a view showing encoding bit rate of input picture and timing of its output bit rate in the example of FIG. 10.

FIG. 11 is a view for explaining time changes of encoding bit rates of respective encoders and output bit rates from the encoder buffer of the first video signal video 1 and the second video signal video 2 in the example of FIG. 10. In this case, as an example, time unit for changing encoding bit rate is caused to be GOP (e.g., 15 frames). With respect to the first video signal video 1, encoding bit rate of the second video signal video 2 changes after delay time $\delta$ (=$\tau 1-\tau 2$). After $\tau 1$ from the time when encoding bit rate has been changed, output bit rate of the first video signal video 1 from the buffer changes. After $\tau 2$ from the time when encoding bit rate of the second video signal video 2 changes, output bit rate from the buffer changes. In addition, sum total of output bit rates of the first video signal video 1 and the second video signal video 2 becomes constant.

It is to be noted that while in the case where the number of video encoders is two has been described in the above-described method of the second embodiment, it is a matter of course that this method can be applied to two video encoders or more. In addition, this invention can be applied not only to video encoder but also audio encoder.

Figure 12:
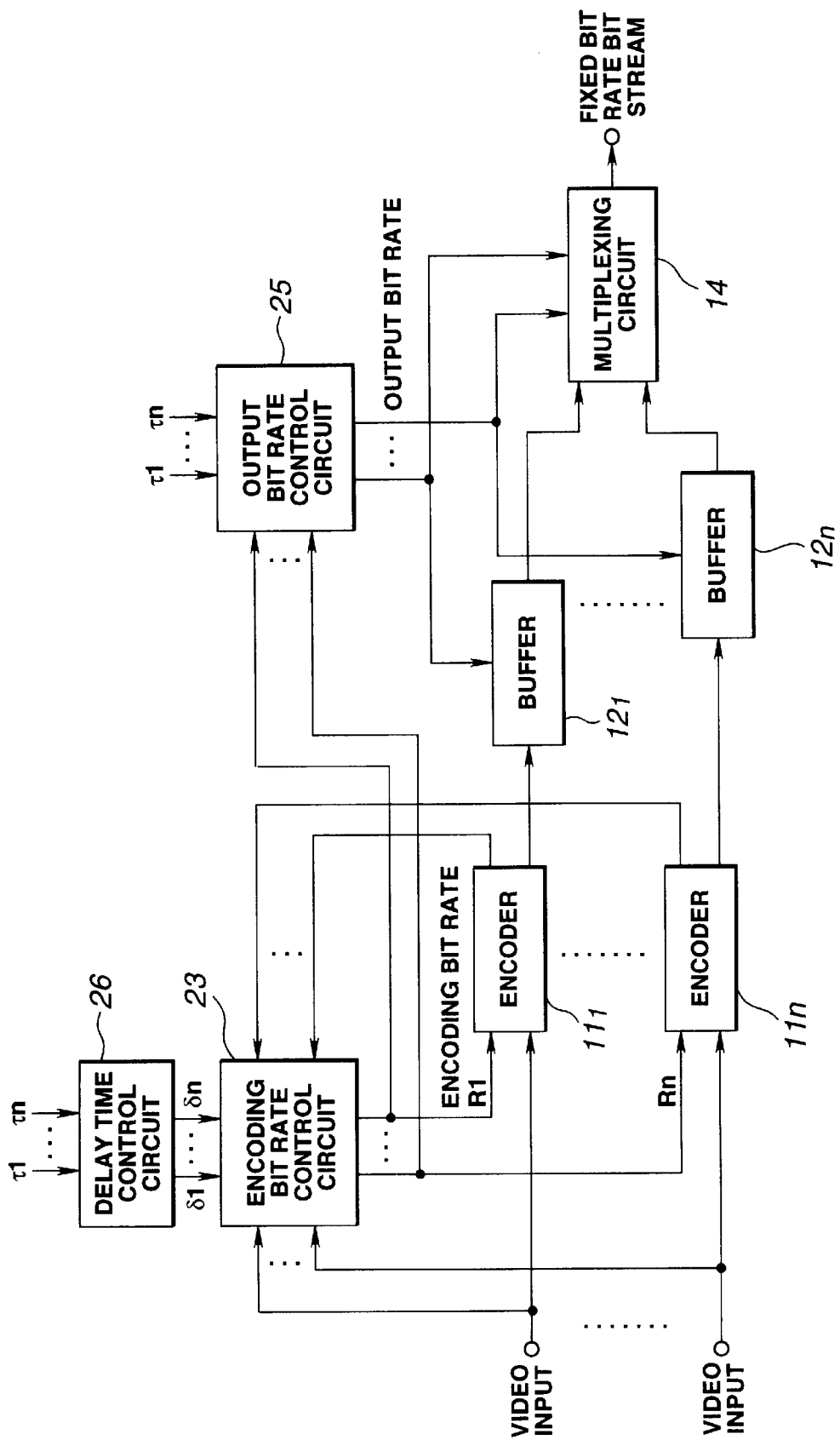
FIG. 12 is a block diagram showing encoding system for realizing the example of FIG. 10.

FIG. 12 shows a block diagram of statistical multiplexing encoder system to which the encoded signal transmission method of the above-described second embodiment is applied. In the following explanation, the explanation of the statistical multiplexing encoder system to which the encoded signal transmission method of the first embodiment is applied is omitted with the same reference numerals being respectively attached to the same portions and only the different portions will now be mainly described.

With respect to the encoders $11_1 \sim 11_n$, respective delay times $\tau 1$ to $\tau n$ from the time when encoding bit rate has been changed until output bit rate of the encoder buffer has been changed are inputted to the delay time control circuit 26. The delay time control circuit 26 selects the maximum value $\tau max$ among respective $\tau 1$ to $\tau n$ to calculate $\delta n$ from $\tau max$ and difference time $\delta 1$ of $\tau 1$ to $\tau n$.

$$\tau max = max[\tau 1, \ldots, \tau n] \quad (16)$$

$$\delta 1 = \tau max - \tau 1 \quad (17)$$

$$\ldots$$

$$\delta n = \tau max - \tau n \quad (18)$$

These $\delta 1$ to $\delta n$ are inputted to the encoding bit rate control circuit 13.

The encoding bit rate control circuit 23 outputs encoding bit rates of respective encoders $11_1 \sim 11_n$ to respective encoders $11_1 \sim 11_n$ by taking corresponding difference times $\delta 1$ to $\delta n$ into consideration. Namely, the encoding bit rate control circuit 23 initially designates change of encoding bit rate of encoder where delay time is maximum ($\tau max$) among encoders $11_1 \sim 11_n$ thereafter to designate change of encoding bit rates of encoders except for its encoder after delay times corresponding to respective difference times $\delta 1 \sim \delta n$. In this case, encoding bit rates $R1(t) \sim Rn(t)$ of respective encoders $11_1 \sim 11_n$ are determined so as to satisfy the following condition $$R1(t+\delta 1) + R2(t+\delta 2) + \ldots + Rn(t+\delta n) = constant$$

In this case, Ri(t) represents encoding bit rate at time t of the i-th encoder.

Moreover, encoding bit rates $R1 \sim Rn$ and the delay times $\tau 1 \sim \tau n$ of respective encoders $11_1 \sim 11_n$ from the encoding bit rate control circuit 23 are inputted to the output bit rate control circuit 25. The output bit rate control circuit 25 designates (indicates) change of output bit rate after delay time of $(\tau i+\Delta\tau)$ from the time when encoding bit rate of the i-th encoder $11_i$(i=1~n) has been changed with respect to the i-th buffer $12_i$ and the multiplexing circuit 14. In this case, $\Delta\tau$ is constant time of 0 or more common to n number of encoders.

Figure 13:
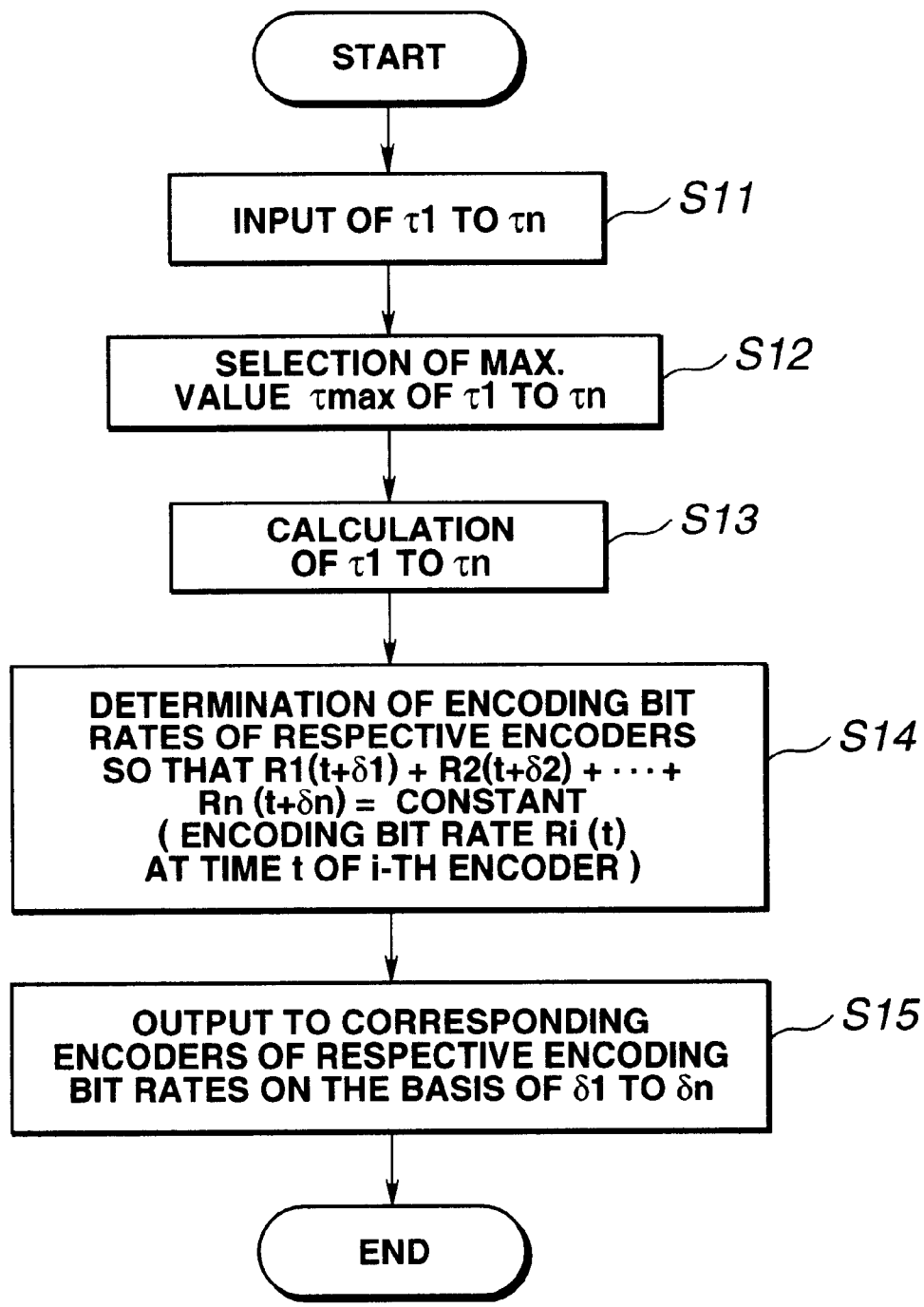
FIG. 13 is a flowchart for explaining the operation of delay time control circuit and output bit rate control circuit of FIG. 10.

The operation every predetermined time period of the delay time control circuit 26 and the encoding bit rate control circuit 23 will now be described with reference to the flowchart show in FIG. 13. In this case, the step S11 to the step S13 are operation of the delay time control circuit 26, and steps S14 and S15 are operation of the encoding bit rate control circuit 23.

Initially, at step S11, with respect to respective encoders $11_1$~$11_n$, respective delay times τ1~τn from the time when encoding bit rate has been changed until output bit rates of encoder buffers $12_1$~$12_n$, are changed are inputted. Further, the processing operation proceeds to step S12, at which maximum value τmax among respective delay times τ1~τn is selected. Further, the processing operation proceeds to step S13, at which difference times δ1~δn between selected maximum value τmax and respective delay times τ1~τn are calculated. Thereafter, the processing operation proceeds to step S14. Thus, encoding bit rates R1(t)~Rn(t) of respective encoders $11_1$~$11_n$ are determined so as to satisfy the following condition.

$$R1(t+\delta1)+R2(t+\delta2)+\ldots+Rn(t+\delta n)=\text{constant}$$

In this case, Ri(t) represents encoding bit rate at time t of the i-th encoder.

Further, at step S15, encoding bit rates R1(t)~Rn(t) of the determined respective encoders $11_1$~$11_n$ are outputted after respective difference times δ1~δn.

Figure 14:
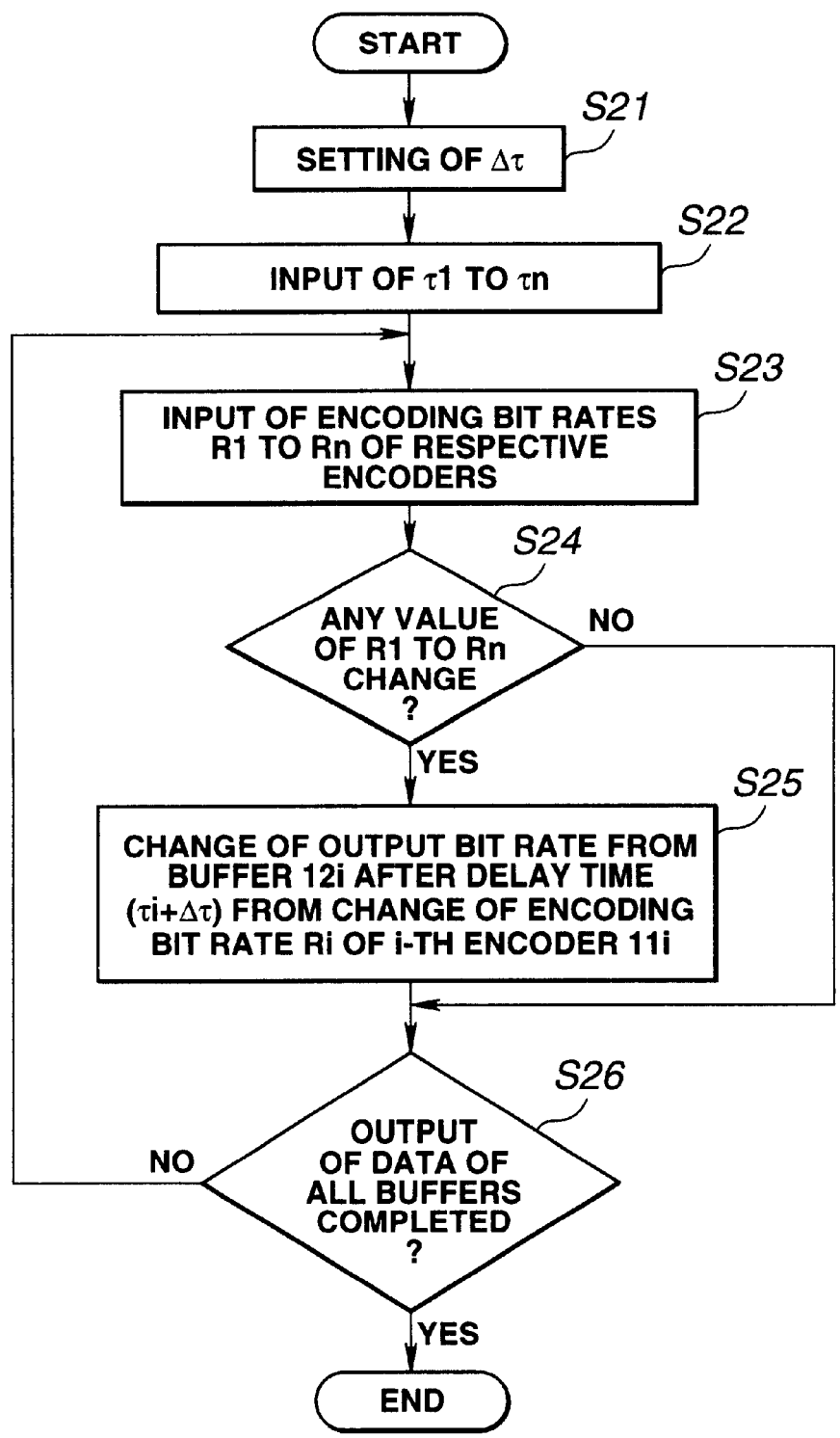
FIG. 14 is a flowchart for explaining another operation of delay time control circuit and output bit rate control circuit of FIG. 10.

Further, the operation every predetermined time period of the delay time control circuit 26 and the encoding bit rate control circuit 23 will now be described with reference to the flowchart shown in FIG. 14.

Initially, at step S21, constant time Δτ of 0 or more common to respective encoders $11_1$~$11_n$ is set. At step S22, with respect to respective encoders $11_1$~$11_n$, respective delay times τ1~τn from the time when encoding bit rates have been changed until output bit rates of encoder buffers $12_1$~$12_n$ are changed are inputted. Further, at step S23, encoding bit rates R1~Rn of respective encoders $11_1$~$11_n$ from the encoding bit rate control circuit 23 are inputted. Further, the processing operation proceeds to step S24, whereby whether or not respective values of encoding bit rates R1~Rn have been changed is judged. In the case where values of encoding bit rates R1~Rn change, the processing operation proceeds to step S25. After delay time-of (τi+Δτ) is passed from the time when value of the encoding bit rate Ri has been changed, values of encoding bit rates are delivered to buffer $12_i$ and multiplexing circuit 14 as output bit rate so as to change output bit rate of corresponding buffer $12_i$ into its changed encoding bit rate. Moreover, in the case where values of encoding bit rates R1~Rn are not changed, the operation of the step S25 is skipped. Then, the processing operation proceeds to step S26, at which whether encoded data of all buffers $12_1$~$12_n$, have been outputted is judged. In the case where encoded data is not outputted, the processing operation returns to step S23. Thus, the above-described operation is repeated. In addition, in the case where encoded data of all buffers $12_1$~$12_n$, are outputted, its operation is completed.

Buffer size B_i necessary even at the minimum for the i-th encoder $11_i$ is calculated by the following formula (19), i.e., $$B\_i=B*R\max\_i/R\min\_i \quad (19)$$

In this case, Rmin_i and Rmax_i are respectively minimum value and maximum value of encoding bit rate of the i-th encoder $11_i$, and B is decoder buffer size.

When the above-mentioned Δτ is greater than 0, buffer of size of ΔB_i further calculated by the following formula (20) is additionally required as buffer size necessary for the i-th encoder $11_i$.

Namely, $$\Delta B\_i=R\max\_i*\Delta\tau \quad (20)$$

In accordance with the embodiment of the encoded signal transmission method and the encoded signal transmission apparatus according to this invention as described above, such a scheme is employed that in the case where outputs of plural encodes which encode digital signals at variable bit rates are multiplexed to carry out transmission thereof at a predetermined bit rate, an approach is employed to control output bit rates from respective encoder buffers on the basis of delay times from the time when encoding bit rates of respective encoders have been changed until output bit rates of respective encoder buffers are changed, thereby making it possible to stably keep constant sum total of input bit rates to the multiplexer.

Thus, at the encoder side, there is no possibility that multiplexed output bit rate may exceed capacity of the transmission path (transmission path capacity), or buffer of the encoder may overflow or underflow. Accordingly, stable signal transmission can be made. In addition, at the decoder side, there is no possibility that buffer of the decoder may overflow or underflow. Thus, stable signal reproduction can be made.

Moreover, in accordance with this invention, end-to-end delays from the time point of picture inputs of respective encoders until picture outputs of the decoders are permitted to be different from each other. Thus, it is possible to respectively multiplex, under suitable delay quantities, video sequences for which low delay is required like communication or news program and video sequence to which no attention is paid.

Further, since it was conventionally impossible to guarantee to stably keep constant sum total of input bit rates to the multiplexer, an approach is employed to allow sum total of encoding bit rates of predetermined times to respective encoders to be lesser than the capacity of the transmission path by taking margin in consideration. However, in accordance with this method, since the sum total of encoding bit rates is permitted to be value closer to the capacity of the transmission path than the prior art, encoding picture qualities of respective encoders can be improved.

It is to be noted that this invention is not limited to the above-described embodiments, and while the case where video signals are encoded and are subjected to transmission has been described in the above-described embodiments, this invention can be also applied to audio signals or data signals of text, etc.

What is claimed is:

1. An encoded signal transmission method of encoding a digital signal at a variable bit rate to temporarily store its encoded signal into a buffer to output, as a bit stream, the encoded signal at a predetermined bit rate from the buffer, the method comprising the steps of:

receiving the digital signal;

encoding the digital signal at an encoding bit rate to provide an encoded signal for storage in the buffer; and controlling the output bit rate of the buffer on the basis of a delay time τ after the encoding bit rate has been changed until the output bit rate of the buffer changes;

wherein the delay time τ is determined by τ=B/Rmin, where Rmin is a minimum value of the encoding bit rate, and B is a size of a decoder buffer for use in decoding the encoded signal.

2. An encoded signal transmission method of encoding n (n≧2) number of digital signals at a variable bit rate by using n number of encoders to temporarily store their n number of encoded signals into n number of buffers corresponding to the n number of encoders to multiplex the encoded signals outputted as bit stream at a predetermined bit rate from the respective buffers to output it, the method comprising the steps of:

receiving n digital signals;

encoding the n digital signals at respective encoding bit rates in respective encoders to output n encoded signal;

controlling output bit rates of the n respective buffers on the basis, for each buffer, of a delay time $\tau i$ (i=1 to n) from the time when the encoding bit rate of the respective encoder has been changed until the output bit rate of the buffer changes; and multiplexing the output bits from the n number of buffers to provide an output multiplexed bit stream wherein the delay times $\tau i$ with respect to respective encoders are determined by $\tau i = B/Rmin\_i$ when $Rmin\_i$ is a minimum value of the encoding bit rate for the ith encoder and B is a size of a decoder buffer for use in decoding the encoded signal.

3. An encoded signal transmission method as set forth in claim 2, further comprising the step of selecting a maximum value $\tau max$ for the delay times $\tau i$.

4. An encoded signal transmission method as set forth in claim 2, further comprising the step of selecting a maximum value $\tau max$ for delay times $\tau i$, and wherein $Ri(t)$ is an encoding bit rate of the ith encoder at time t, such that $R1(t+\delta 1)+R2(t+\delta 2)+ \ldots +Rn(t+\delta n)$=constant is used to change the output bit rate of the i-th encoder after a delay time of $(\tau max+\delta i)$ from when the encoding bit rate of the i-th encoder has been changed, where $\delta i$ is a predetermined time for the ith encoder.

5. An encoded signal transmission method as set forth in claim 4, wherein the predetermined times $\delta i$ of the respective encoders are determined by $\delta i = \tau max - \tau i$.

6. An encoded signal transmission method as set forth in claim 4, further comprising the step of changing the output bit rates of respective buffers after delay time $\Delta \tau$, which is a predetermined time of 0 or more common to the n number of encoders-, from the- time when encoding bit rates of the respective encoders have been changed $(\tau i + \Delta \tau)$.

7. An encoded signal transmission apparatus adapted for encoding a digital signal at a variable bit rate to output an encoded signal at a predetermined bit rate as a bit stream, the apparatus comprising:

a receiving unit adapted to receive the digital signal;

an encoder for encoding the digital signal at an encoding bit rate to output an encoded signal;

a buffer connected to the encoder to temporarily store the encoded signal; and a buffer control circuit for controlling the output bit rate of the buffer on the basis of delay time $\tau$ from the time when the encoding bit rate has been changed until the output bit rate of the buffer changes;

wherein the delay time $\tau$ is determined by $$\tau = B/Rmin,$$

where Rmin is a minimum value of the encoding bit rate and B is a size of a decoder buffer for decoding the encoded signal.

8. An encoded signal transmission apparatus adapted for encoding, at a variable bit rate, n number of digital signals to output n number of encoded signals at a predetermined bit rate as a multiplexed bit stream, where n is greater than or equal to two, the apparatus comprising:

n receiving units adapted to receive the n digital signals;

n encoders for encoding the n digital signals at respective encoding bit rates to output n encoded signals;

n buffers connected to respective ones of the n encoders, and adapted for temporarily storing encoded signals from the encoders connected thereto;

a buffer control circuit for controlling output bit rates of respective buffers on the basis of delay times $\tau i$ (i=1 to n) from the time when the encoding bit rate of the ith encoder has been changed until the output bit rate of the buffer changes with respect to the respective encoders; and a multiplexing unit for multiplexing n output signals from the n number of buffers to provide an output multiplexed bit stream wherein the delay times $\tau i$ with respect to the respective encoders are determined by $\tau i = B/Rmin\_i$ where $Rmin\_i$ is a minimum value of the encoding bit rate for the ith encoder and B is a size of a decoder buffer.

9. An encoded signal transmission apparatus as set forth in claim 8, wherein the buffer control circuit selects a maximum value of $\tau max$ for the delay times $\tau i$.

10. An encoded signal transmission apparatus as set forth in claim 8, which further comprises an encoder control circuit for controlling encoding bit rates of respective encoders, wherein $Ri(t)$ is an encoding bit rate of the ith encoder at time t, and wherein this encode control circuit selects a maximum value $\tau max$ for delay times $\tau i$ such that $R1(t+\delta 1)+R2(t+\delta 2)+ \ldots +Rn(t+\delta n)$=constant at time t of the i-th (i=1 to n) encoder to change the output bit rate of the i-th encoder after a delay time of $(\tau max+\delta i)$ from when the encoding bit rate of the i-th encoder has been changed, where $\delta i$ is a predetermined time.

11. An encoded signal transmission apparatus as set forth in claim 10, wherein the predetermined times $\delta i$ of the respective encoders are determined by $\delta i = \tau max - \tau i$.

12. An encoded signal transmission apparatus as set forth in claim 10, wherein the buffer control circuit changes output bit rates of respective buffers after delay time $\Delta \tau$, which is a predetermined time of 0 or more common to the n number of encoders, from the time when encoding bit rates of respective encoders have been changed $(\tau i + \Delta \tau)$.

* * * * *

UNITED STATES PATENT AND TRADEMARK OFFICE
CERTIFICATE OF CORRECTION

PATENT NO.     : 6,504,850 B1
DATED          : January 7, 2003
INVENTOR(S)    : Motoki Kato and Hideki Koyanagi It is certified that error appears in the above-identified patent and that said Letters Patent is hereby corrected as shown below:

<u>Column 5,</u>
Line 50, "A" should read -- A1 --.

<u>Column 15,</u>
Line 42, "encoders-, from the- time" should read -- encoders, from the time --.

Signed and Sealed this

Twenty-fourth Day of June, 2003

JAMES E. ROGAN
*Director of the United States Patent and Trademark Office*